United States Patent
Kumagai et al.

(10) Patent No.: US 6,313,926 B1
(45) Date of Patent: *Nov. 6, 2001

(54) DATA PROCESSING METHOD FOR CONTROLLING THE TRANSFER OF DATA TO A NETWORK

(75) Inventors: Takekazu Kumagai, Yokohama; Seishi Ejiri, Kawasaki, both of (JP); Soichi Yamamuro, San Jose, CA (US); Masaya Kondo, Yokohama (JP); Takeshi Tsukamoto, Kawasaki (JP); Masaru Saruwatari, Kawasaki (JP); Masaki Toyama, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,139

(22) Filed: Jan. 24, 1997

(30) Foreign Application Priority Data

Jan. 26, 1996 (JP) .................................................... 8-011702
Dec. 19, 1996 (JP) .................................................... 8-339556

(51) Int. Cl.⁷ .................................................... H04N 1/32
(52) U.S. Cl. .................... 358/442; 358/402; 358/405; 358/434
(58) Field of Search .................................. 358/402–407, 358/440, 434, 468, 442; 395/200.49; 379/100.06, 100.08

(56) References Cited

U.S. PATENT DOCUMENTS

| | | | |
|---|---|---|---|
| 4,549,219 | * | 10/1985 | Sue et al. |
| 5,283,665 | * | 2/1994 | Ogata .................................... 358/434 |
| 5,377,017 | * | 12/1994 | Lam ...................................... 358/405 |
| 5,552,901 | * | 9/1996 | Kikuchi et al. ....................... 358/468 |
| 5,585,789 | * | 12/1996 | Haneda ............................. 340/825.52 |
| 5,644,404 | * | 7/1997 | Hashimoto et al. .................. 358/402 |
| 5,956,154 | * | 9/1999 | Cairo .................................... 358/434 |

* cited by examiner

Primary Examiner—Leo Boudreau
Assistant Examiner—Ishrat Sherali
(74) Attorney, Agent, or Firm—Morgan & Finnegan, LLP (57) ABSTRACT

There is provided a computer readable program, stored in a storage medium, for controlling a server terminal in a communication system which is structured that a data communication apparatus for transmitting and receiving data via a line and the server terminal for managing a network are at least connected to the same network, the program comprises a notifying step of notifying, in a case where the data communication apparatus received the data from a transmission side via the line, a user on the network of a fact that the data reception was performed, and a sending step of sending, in a case where the notification was performed, information representing such the notification, to the data communication apparatus. Therefore, in case of exchanging the data between the data communication apparatuses at least one of which is connected to the network, when the transmission side inquires whether the data transmitted from the transmission side has been successfully reached the user, i.e., the final destination, of the network, even if the server terminal is carrying out other processes, such the terminal can easily respond to such inquiry.

20 Claims, 10 Drawing Sheets

```
INQUIRED INFORMATION DOES NOT EXIST
        JOB IDENTIFIER 1234
```

FIG. 9B

```
RECEPTION FROM abc FAILED                    9:20
        ⎰ def DOES NOT EXIST
        ⎱ xx ERROR            ETC.
        JOB IDENTIFIER 1235
```

FIG. 9C

```
RECEPTION FROM abd HAS BEEN NORMALLY PERFORMED  9:30
        cde DOES NOT YET LOG IN
        RECEPTION DATA IS BEING HELD
        JOB IDENTIFIER 1236
```

FIG. 9D

```
RECEPTION FROM abe HAS BEEN NORMALLY PERFORMED  9:35
        RECEPTION DATA HAS BEEN PRINTED OUT     9:55
        JOB IDENTIFIER 1237
```

FIG. 9E

```
RECEPTION FROM abf HAS BEEN NORMALLY PERFORMED  9:40
        RECEPTION NOTIFICATION TO bcd TERMINATED 9:43
        RECEPTION DATA IS NOT YET OPENED
        (RECEPTION DATA IS BEING HELD)
        ⎰ bcd IS JUST IN LOGOUT
        ⎱ bcd IS JUST IN LOGIN
        JOB IDENTIFIER 1238
```

FIG. 9F

```
RECEPTION FROM abg HAS BEEN NORMALLY PERFORMED  9:50
        efg OPENED RECEPTION DATA              10:00
        JOB IDENTIFIER 1239
```

DATA PROCESSING METHOD FOR CONTROLLING THE TRANSFER OF DATA TO A NETWORK

BACKGROUND OF THE INVENTION

1. Field of the Invention

The present invention relates to a data processing method for transmitting and receiving (i.e., exchanging) data between data communication apparatuses at least one of which is connected to an individual network such as a local area network (LAN) or the like.

2. Related Background Art

In recent years, it has been desired that a facsimile apparatus or the like is connected to a network such as a LAN or the like which is individually provided, and a user who uses this network transfers document data produced by a client's terminal such as a personal computer or the like to the connected facsimile apparatus to cause the facsimile apparatus to transmit the produced document data to a partner-side facsimile apparatus and transfers data received by the connected facsimile apparatus to a user on the network in response to a designation from a transmission side. In such a case, a server terminal is connected to the network to cause the connected server terminal to manage the network, whereby transfer process of the received data to the network becomes easy.

However, in a case where a data communication apparatus such as the facsimile apparatus or the like which transmits and receives the data in such a manner as described above is provided independently of the server terminal which manages the network, for example, even if the transmission side inquires of the server terminal about whether or not the data transmitted by the transmission side has been successfully reached a final destination, i.e., the user on the network, it is feared that the server terminal can not easily respond to such inquiry if the server terminal is carrying out other process or the like.

Further, also in a case where the same inquiry as above is sent from the transmission side to the data communication apparatus such as the facsimile apparatus or the like which is connected to the network, if the communication apparatus confirms to the user on the network a state of the received data when the inquiry is received, there is a problem that processing efficiency is degraded. Moreover, there is a problem that the data communication apparatus can not effectively notify the transmission side the state of the received data.

SUMMARY OF THE INVENTION

An object of the present invention is to provide a data processing method which eliminates the above-described problems.

An another object of the present invention is to provide a data processing method which can easily respond to inquiry from an another apparatus.

An another object of the present invention is to provide a data processing method which can notify an another apparatus of newest information as to a state of own station.

An another object of the present invention is to provide a data processing method which can quickly notify an another apparatus of information as to own station.

The above and other objects of the present invention will become apparent from the following detailed description when read in conjunction with the accompanying drawings.

DETAILED DESCRIPTION OF THE PREFERRED EMBODIMENTS

Hereinafter, an embodiment of the present invention will be explained in detail with reference to the accompanying drawings.

Figure 1:
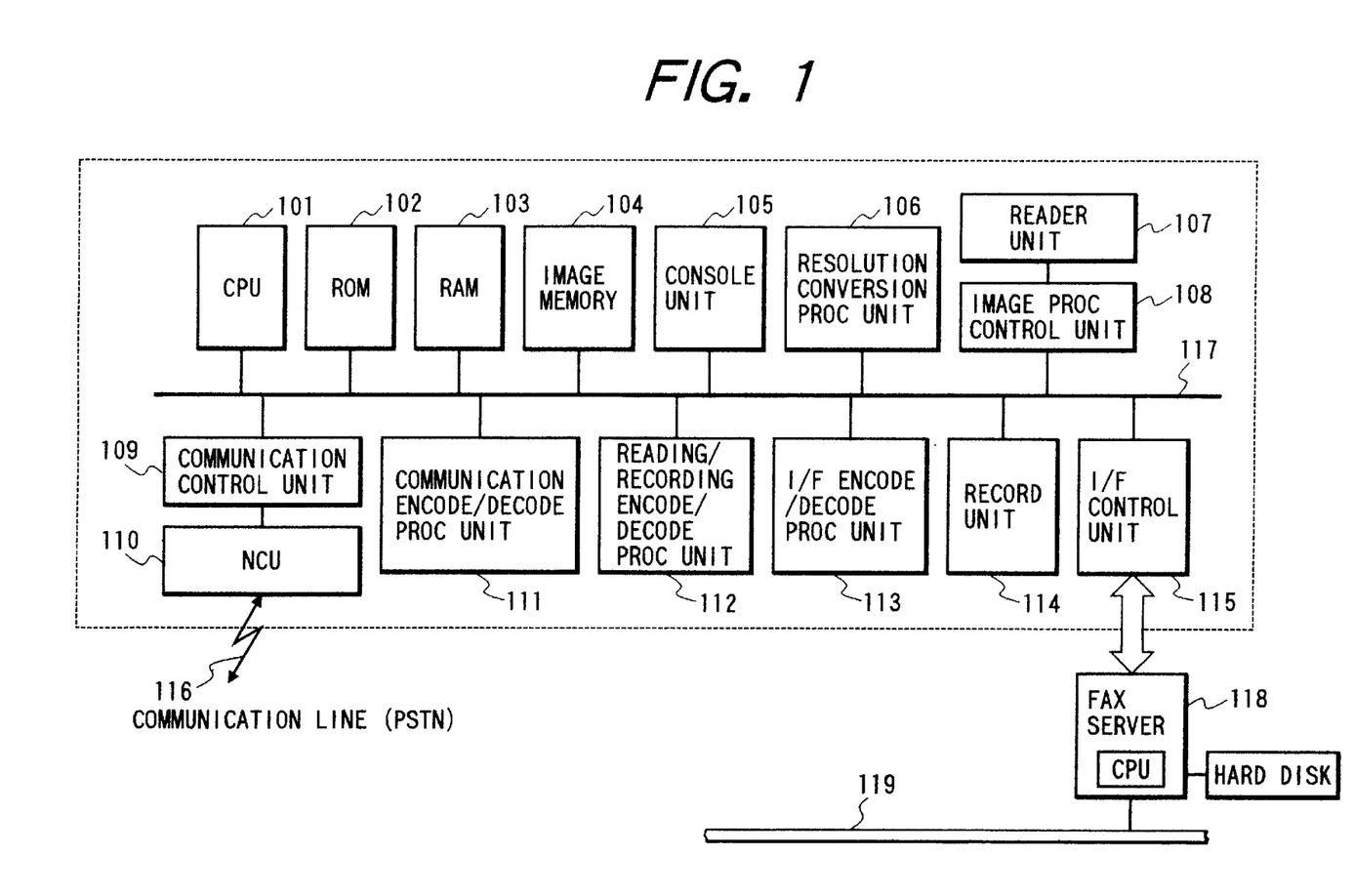
FIG. 1 is a block diagram showing schematic structure of a facsimile apparatus and a facsimile server according to embodiments of the present invention.

FIG. 1 is a block diagram showing schematic structure of a system which is composed of a facsimile apparatus and a facsimile server, according to the embodiment of the present invention.

A CPU 101 is a system control unit which controls the facsimile apparatus as a whole, via a system bus 117. A ROM 102 stores therein control programs and OS (operating system) programs of the CPU 101. A RAM 103 which is composed of an SRAM or the like stores therein program control variables and the like. Moreover, a setting value registered by an operator, management data for the facsimile apparatus and a local area network (LAN) and the like, and various working buffers are also stored in the RAM 103. An image memory 104 which is composed of a DRAM or the like stores therein image data. In the present embodiment, each control program stored in the ROM 102 is subjected to software control such as scheduling, task switching and the like under the control of the OS stored in the ROM 102.

A console unit 105 is composed of various keys, an LED, an LCD and the like performs various input operation by the operator, display of an operation state of the facsimile apparatus and states of equipments on the LAN, and the like.

A reader unit 107 is composed of a CS image sensor, an original feeding mechanism and the like. In the reader unit 107, an original is optically read by using the CS image sensor, and read data is converted into the electrical image data. Then, the converted image data is subjected to various image processes such as a binarization process, a halftone process and the like by an image process control unit 108, to output the highly fine image data. The converted image data is encoded according to a predetermined encoding system, via a reading/recording encode/decode process unit 112, and then the encoded data is stored in the image memory 104.

A record unit 114 is composed of a page printer, a record image process control unit and the like. In the record unit 114, the image data to be recorded is decoded by the reading/recording encode/decode process unit 112, and then the decoded data is subjected to various image processes such as a smoothing process, a recording density correction process and the like by the record image process control unit so as to convert it into the highly fine image data and then visibly output by the page printer. In a case where there is copy instruction or external print request or in a case where ordinary facsimile reception (i.e., facsimile reception other than a later-described process procedure) is performed, the image data is read from the image memory 104 to be printed by the record unit 114.

A communication control unit 109 is composed of a modulation/demodulation unit (MODEM) and the like performs modulation/demodulation control of transmission and reception signals in a facsimile communication. A network control unit (NCU) 110 sends a selection signal (i.e., dial pulse or tone dialer) to an analog communication line (PSTN) 116, detects a call signal, and performs line control such as automatic reception control and the like. The image data stored in the image memory 104 is subjected to a decode process by a communication encode/decode process unit 111, and then subjected to millimeter/inch resolution conversion, an enlargement/reduction process and the like by a resolution conversion process unit 106. The resolution-converted image is subjected to the decode process by the communication encode/decode process unit 111, in accordance with communication partner's ability, thereby performing transmission control.

An interface control unit 115 performs interface control between the facsimile apparatus and an information process terminal (i.e., facsimile server) 118 which is externally connected. The interface control unit 115 includes a buffer for data transmission and reception. In the present embodiment, it is assumed that such the interface control corresponds to a parallel interface such as a bi-directional (i.e., two-way) parallel interface or the like. The facsimile server 118 is connected to a LAN 119. Therefore, the server 118 performs management of the LAN 119 such as management of a state of an information process terminal (i.e., client) on the LAN 119 or the like, and receives transmission from the client, remote operation request such as print request or the like. An interface encode/decode process unit 113 performs encode and decode processes in the interface control.

Transmission from the facsimile server 118 to the facsimile apparatus, the print and a remote operation such as data registration or the like are performed by transmitting predetermined commands, parameters, data and the like to the facsimile apparatus via the interface control unit 115. In the present embodiment, it is assumed that the facsimile server 118 has a hard disk, whereby an application software and a driver software which are used for controlling the remote operation and the remote operation request are installed in this hard disk. A CPU provided in the facsimile server 118 controls various processes on the basis of the programs installed in the hard disk.

Figure 2:
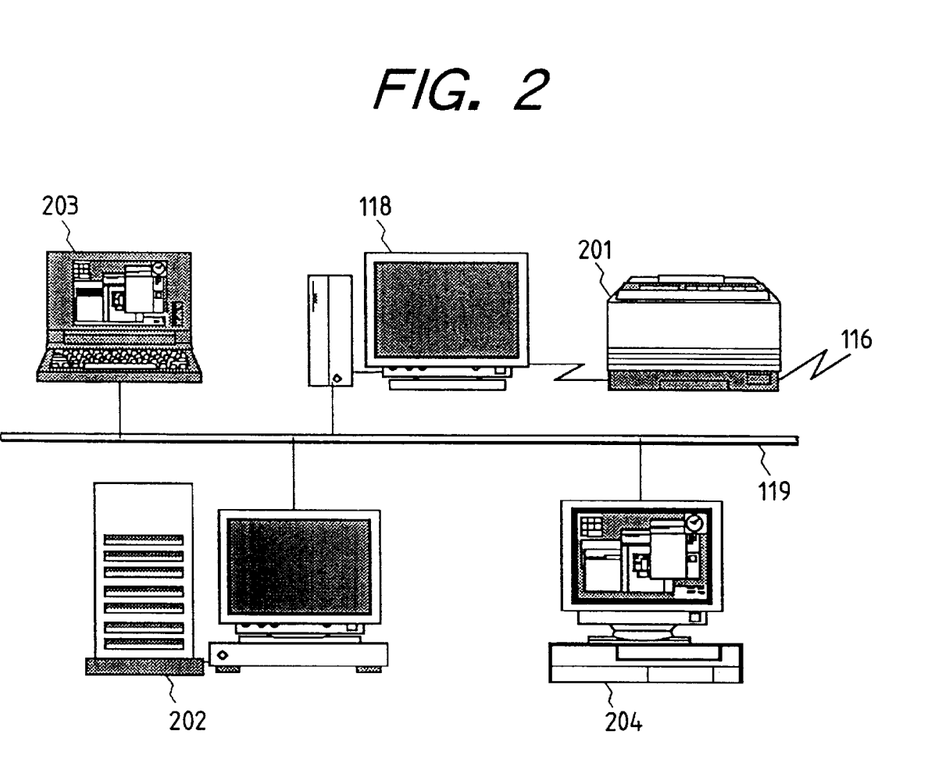
FIG. 2 is a view showing an example in which a facsimile apparatus 201 and a facsimile server 118 illustrated in FIG. 1 are connected to a network.

FIG. 2 is a schematic view showing a connection example in a case where the facsimile apparatus and the facsimile server shown in FIG. 1 are connected to the LAN.

In FIG. 2, reference numeral 201 denotes the facsimile apparatus shown in FIG. 1.

Reference numeral 202 denotes a file server which manages a protocol of the LAN 119 and performs control of a file on the LAN 119 such as holding of the file or the like.

Reference numerals 203 and 204 denote client machines (i.e., terminal machines 1 and 2) which are connected to the LAN 119.

Figures 3, 3A:
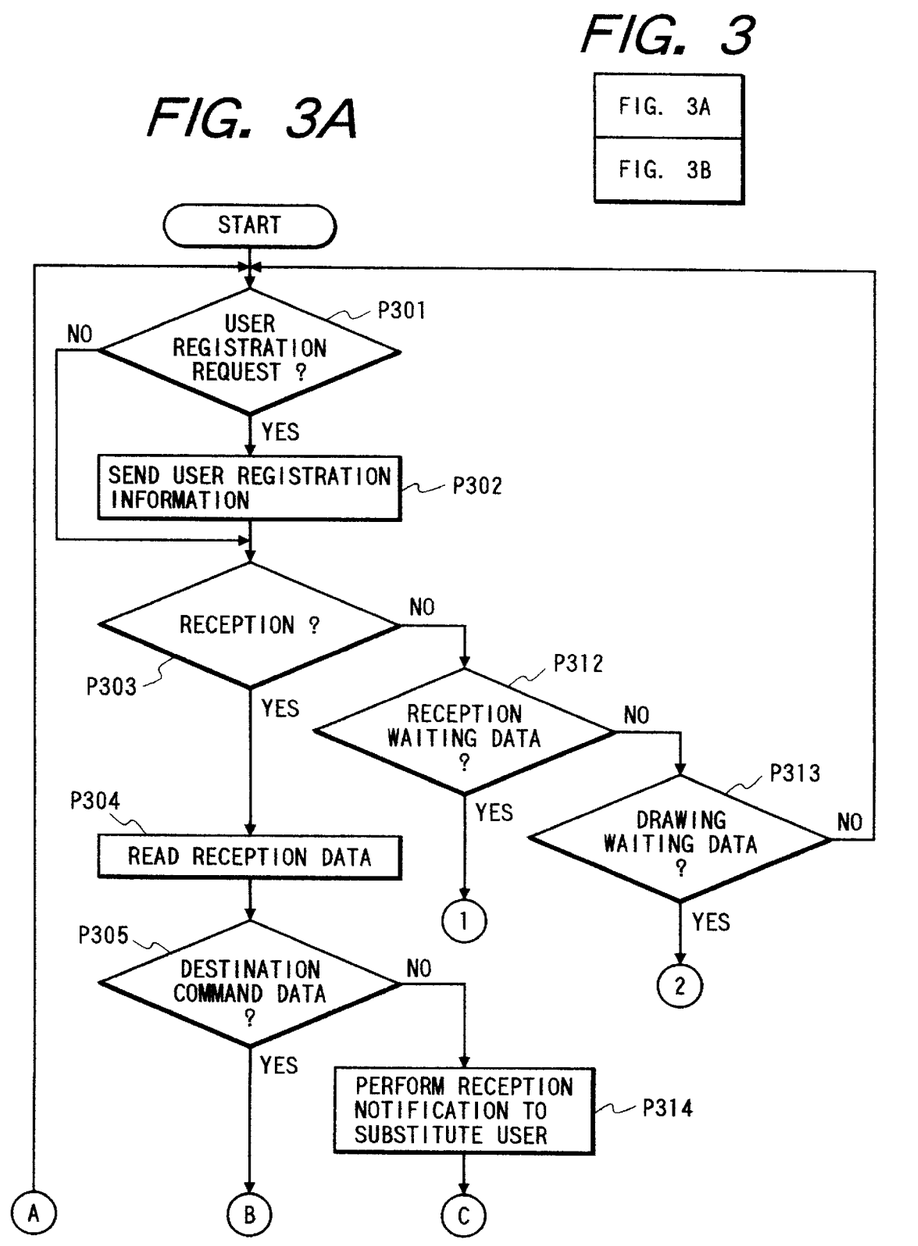
FIG. 3 which is composed of FIGS. 3A and 3B is a flow chart showing a flow of process by the facsimile server 118.
Figure 3B:
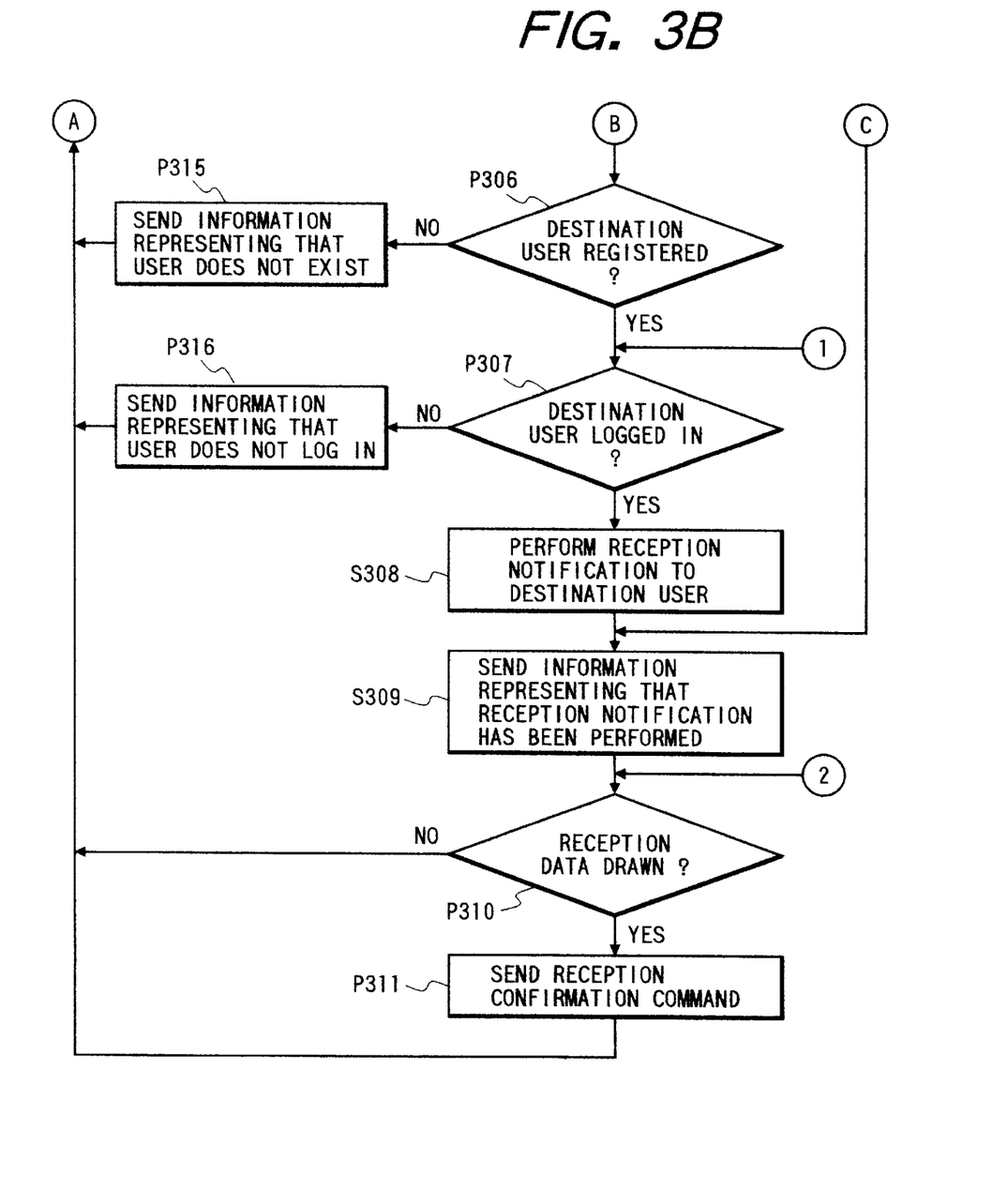

FIGS. 3A and 3B are a flow chart showing a flow of process which is performed by the facsimile server 118. This flow chart shows the process which is controlled by the CPU on the basis of the program installed in the hard disk of the facsimile server 118.

In a step P301, it is discriminated whether or not there is user registration request from a client user. If not, the flow advances to a step P303. On the other hand, if there is a log-in command from the client, since it is necessary to have stored common user information both in the facsimile server 118 and the facsimile apparatus 201, the facsimile server 118 sends user registration information to the facsimile apparatus 201 in a step P302. Further, if there is a log-out command from the client, the facsimile server 118 notifies the facsimile apparatus 201 of such a fact.

In the step P303, the facsimile server 118 sends a reception result obtaining command to the facsimile apparatus 201, to detect whether or not the data (i.e., image and the like) received via the communication line 116 has been stored in the image memory 104. If no data has been stored in the image memory 104, the flow advances to a step P312. On the other hand, if the received data has been stored in the image memory 104, the flow advances to a step P304. In the step P304, the received data is read from the image memory 104 of the facsimile apparatus 201 with designating such the received data, and then stored in a memory such as the hard disk or the like which is controlled by the facsimile server 118. In this case, necessary information as to the received data is read together with such the received data. The detection of the received data in the step P303 is repeated at a predetermined interval.

Then, in a step P305, it is discriminated whether or not the data read from the facsimile apparatus 201 in the step P304 includes destination command data (i.e., indication or instruction of a receiver by a user ID or the like). If the destination command data is included, the flow advances to a step P306, while if not included, the flow advances to a step P314.

In the step P306, it is judged whether or not the user who was indicated as a destination of the received data in the step P305 has been registered as a user on the LAN 119. If registered, the flow advances to a step P307. On the other hand, if not registered, the flow advances to a step P315 to send to the facsimile apparatus 201 information representing that the user indicated as the destination does not exist on the LAN 119.

In the step P307, it is judged whether or not the user who was indicated as the destination of the received data in the step P305 has logged in (i.e., whether or not such the user uses the LAN 119). If logged in, the flow advances to a step P308. On the other hand, if not logged in (i.e., in a log-out state), the flow advances to a step P316 to send to the facsimile apparatus 201 information representing that the user who was indicated as the destination does not yet log in. In this case, the received data is temporarily stored in a predetermined storage area which has been allocated for each user.

In the step P308, the user who was indicated as the destination is notified of the fact that there is the received data to be transferred to such the destination user (i.e., reception notification is performed). In this case, if plurality of destination users were indicated as the destinations, all the users are notified of such reception information. Further, in a step P309, the facsimile server 118 sends to the facsimile apparatus 201 information representing that the server 118 performed the reception notification to the user who was indicated as the destination.

On the other hand, if it is judged in the step P305 that the destination command data is not included in the data read from the facsimile apparatus 201, in the step P314, such the reception notification is performed to a substitute user (i.e., management user which has been previously set by the facsimile server 118 and is always in a log-in state). In this case, a reason of the reception notification and a message representing that the reception notification was performed to the substitute user because of no destination indication may be included in the information to be sent in the step P309.

In a step P310, it is judged whether or not, by the user to which the reception notification was performed, the received data to be transferred to such the user has been drawn or derived from the facsimile server 118 (i.e., the memory which is managed by the facsimile server 118). If there is a drawing (deriving) request from the user, the received data is transferred to the client machine of such the user. Then, when the received data is transferred to the destination user, the flow advances to a step P311, to transmit to the facsimile apparatus 201 a reception confirmation command which represents that the received data was transferred to the user who is the final destination. In this case, the received data drawing request may be performed by the user at an arbitrary time. When there is the drawing request, it is confirmed whether or not the received data is present. Then, if the received data is present, such the received data is transferred to the user such that he can confirm it. On the other hand, the received data drawing request may be automatically performed at the log-in time.

The above-described process is repeated until it is judged in the step P312 that there is no reception waiting data to be transferred to the destination user and it is further judged in a step P313 that there is no drawing waiting data transferred from the destination user.

Further, the above-described process is repeated at a predetermined timing.

Figure 4:
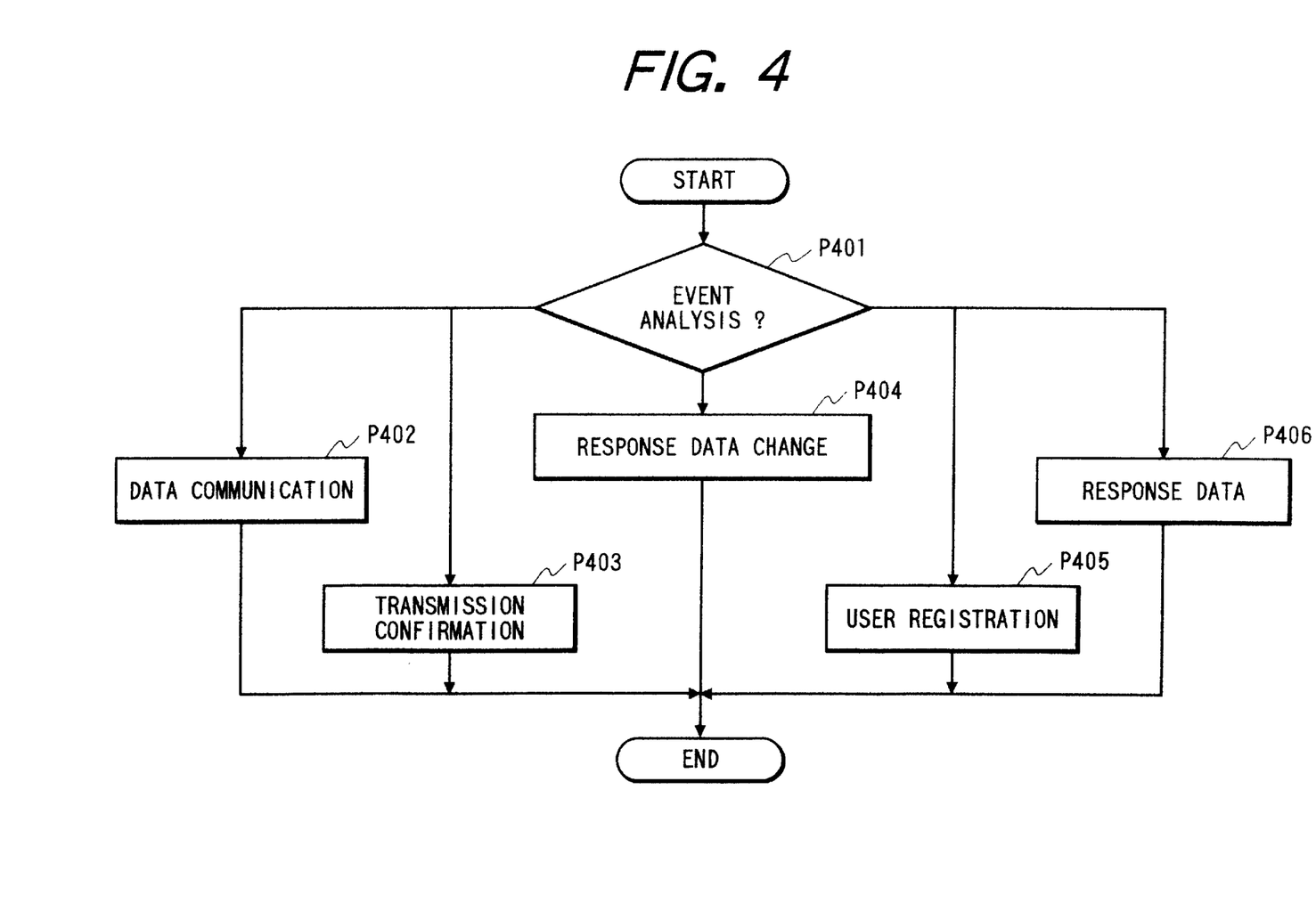
FIG. 4 is a flow chart showing a flow of process by the facsimile apparatus 201.

FIG. 4 is a flow chart for explaining a process performed in the facsimile apparatus 201. The process explained in this flow chart is an event handling process which starts after input/output data of a hardware, the data in the RAM and the like were initialized.

A step P401 represents an event analysis process which observes a state of the apparatus, analyzes an event on the basis of a state change of the communication line 116 or the interface control unit 115 and timer observation, so as to determine which program is to be performed.

A step P402 represents a reception process which is performed in case of detecting that a facsimile data transmission command is received from a transmission side via the communication line 116. The process in the step P402 will be explained later with reference to FIG. 5.

A step P403 represents a process which is performed in case of detecting that a transmission confirmation command is received from the transmission side via the communication line 116. The process in the step P403 will be explained later with reference to FIG. 6.

A step P404 represents a process which is performed when information for response data such as a reception confirmation command or the like is received from the facsimile server 118 via the interface control unit 115. The process in the step P404 will be explained later with reference to FIG. 7. In this case, the facsimile server 118 produces the reception confirmation command in case of accepting information representing that facsimile-received data was read, from the destination client user.

A step P405 represents a process which receives a user registration command from the facsimile server 118 via the interface control unit 115 and registers the user on the LAN to a predetermined area in the RAM 103. In the user registration command, it is indicated or instructed to register user discrimination information as to a user name and the like. In this case, the facsimile server 118 produces the user registration command in case of registering the user discrimination information by the client user.

A step P406 represents a process which is performed in case of elapsing a predetermined time after the image data was received (under time observation) or is performed after the process for receiving the reception confirmation command was performed in the step P404. In this case, a call is generated via the communication line 116, and the response data (i.e., receiver information) is transmitted. The process in the step P406 will be explained later with reference to FIG. 8.

Figure 5:
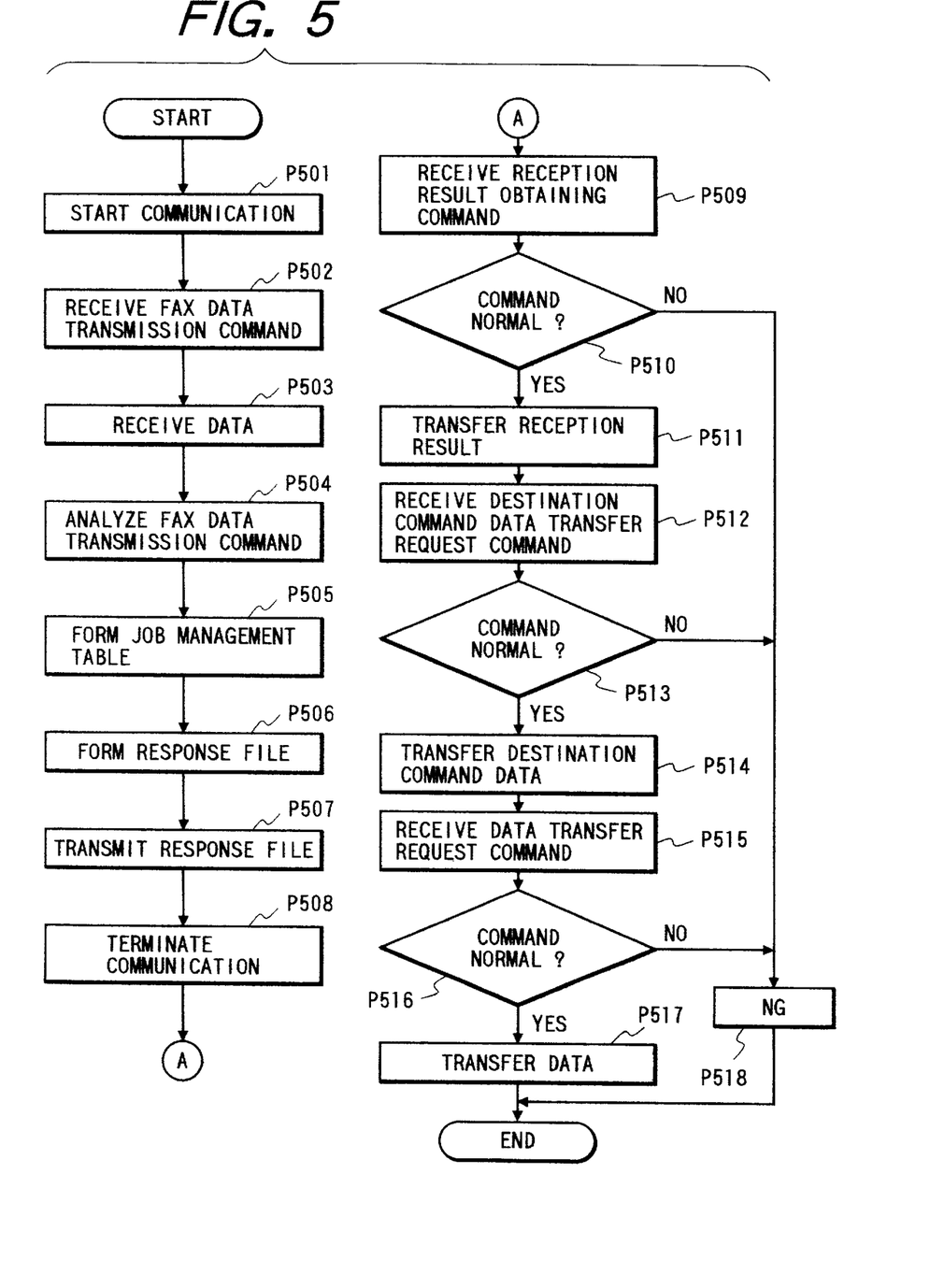
FIG. 5 is a flow chart showing a flow of process by the facsimile apparatus 201.

FIG. 5 is a flow chart showing a flow of process which is performed in a case where the facsimile apparatus 201 received the facsimile data transmission command from an other facsimile apparatus, via the communication line 116.

The facsimile data transmission command includes data which is used to set the final destination of facsimile data (image data) transmitted from the facsimile apparatus corresponding to a G3 mode at the transmission side to the facsimile apparatus connected to the receiver-side LAN, as the user who is using the LAN. Further, the facsimile data transmission command represents the data which is used to indicate the final destination on the basis of binary data by using a BFT (binary file transfer) communication mode defined by ITU (International Telecommunications Union) Recommendation T. 30.

Initially, in a step P501, a communication mode or the like corresponding to a partner's apparatus is set in response to a call generated from the transmission side, to start a communication. At this time, the transmission side is notified of a fact that the reception side is the facsimile apparatus which is connected to the LAN, by an NSF (non-standard facilities) signal.

Then, in a step P502, the facsimile data transmission command is received from the transmission side via the communication line 116. In this step, by the received data, it is notified of a transmission-source facsimile number, a transmission-source user, a transmission indication time, reception user discrimination information and the like. In this case, the received data is added with data discrimination information (i.e., information for specifying received data), and then the obtained data is temporarily stored in the predetermined storage area in the RAM 103 (i.e., as destination command data).

Subsequently, in a step P503, the facsimile data (i.e., document data, image data) is received, the data discrimination information is added to the received data, and then the obtained data is stored in the image memory 104.

When the reception of the facsimile data terminates, the previously-received facsimile data transmission command is analyzed (step P504), and then a job management table for the user who has been indicated as the final destination is formed in the RAM 103 (step P505). In the job management table, job discrimination information, user information and the like are recorded. Then, it is checked in this job management table whether or not the user indicated as the final destination has been registered at the predetermined area in the RAM 103, and the response data is produced or generated on the basis of a checked result (step P506). The produced response data includes information as to whether or not the user indicated as the destination from the transmission side has been registered at the predetermined area in the RAM 103, and the like. Thereafter, in a step P507, the transmission/reception of the communication data is inverted to transmit the response data produced in the step P506 to a partner side (i.e., transmission side). When the transmission of the response data terminated, in a step P508, the communication terminates and thus the line is disconnected.

After the reception of the facsimile data terminated, in a step P509, a reception result obtaining command is received from the facsimile server 118 via the interface control unit 115. In this case, it is assumed that the facsimile server 118 periodically produces the reception result obtaining command to detect the reception of the facsimile data. Then, if the reception result obtaining command is received, the facsimile apparatus 201 checks whether or not the received command is normal (step P510). If not normal, the flow advances to a step P518 to notify the facsimile server 118 of a message "NG (no good)" via the interface control unit 115 and terminate the process. On the other hand, if normal, the flow advances to a step P511 to notify the facsimile server 118 of reception result information via the interface control unit 115. The reception result information to be notified in the step P511 includes reception job discrimination information, destination command (or indication) data discrimination information, facsimile data discrimination information and the like.

Then, in a step P512, the facsimile apparatus 201 receives a destination command (or indication) data transfer request command from the facsimile server 118. By the destination command data transfer request command, the destination command data discrimination information or the like which has been notified from the facsimile server 118 at the time of obtaining the reception result is indicated. Subsequently, in a step P513, the received command is analyzed. In this case, if the command is not normal, e.g., abnormality is found in the data discrimination information, the flow branches off to the step P518. On the other hand, if the command is normal, the flow advances to a step P514 to transfer the destination command data to the facsimile server 118.

Subsequently, the facsimile apparatus 201 receives a facsimile data transfer request command from the facsimile server 118 (step P515). By the facsimile data transfer request command, the facsimile data discrimination information or the like is indicated. Then, in a step P516, the received command is analyzed. In this case, if the command is not normal, e.g., the abnormality is found in the data discrimination information, the flow branches off to the step P518. On the other hand, if the command is normal, the flow advances to a step P517 to read from the image memory 104 the facsimile data received from the transmission side and then to transfer the read data to the facsimile server 118.

Figure 6:
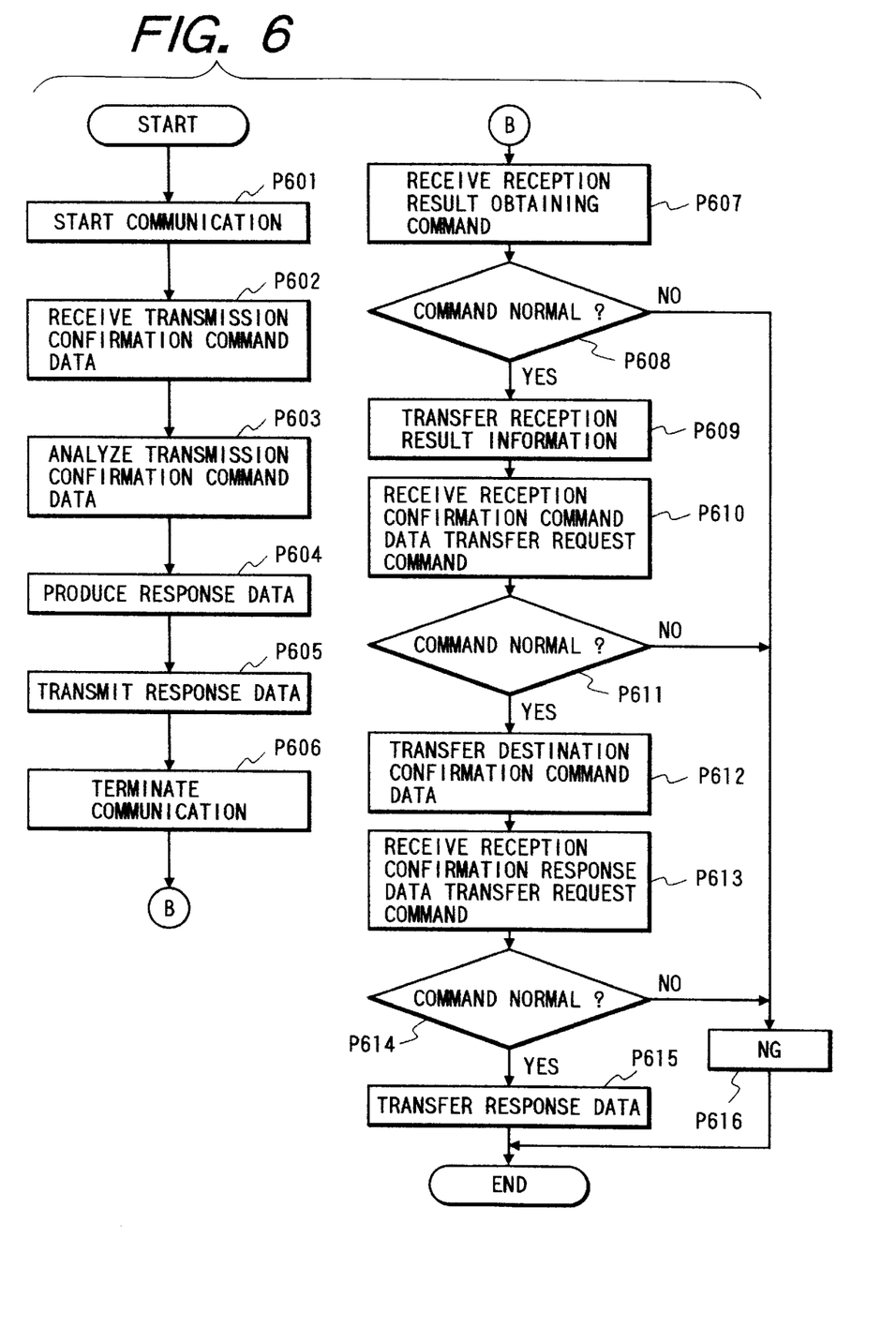
FIG. 6 is a flow chart showing a flow of process by the facsimile apparatus 201.

FIG. 6 is a flow chart showing a flow of process which is performed in a case where the facsimile apparatus 201 received a transmission confirmation command from the transmission-side facsimile apparatus via the communication line 116.

The transmission confirmation command is a command which is produced by the transmission-side facsimile apparatus corresponding to the G3 mode to inquire, of the reception-side facsimile apparatus, a result of the facsimile-data transmission which has been previously performed and is based on the facsimile data transmission command. The facsimile apparatus which received the transmission confirmation command transmits reception confirmation response data.

Initially, in a step P601, the communication mode or the like corresponding to the partner's apparatus is set in response to the call generated from the transmission side, to start the communication. Then, in a step P602, the facsimile apparatus 201 receives transmission confirmation command data from the communication line 116. In this step, by the received data, it is also notified of the transmission-source facsimile number, the transmission-source user, the reception user discrimination information and the like. In this case, the received data is added with the data discrimination information, and then the obtained data is temporarily stored at the predetermined storage area in the RAM 103 (i.e., as reception confirmation data). Thereafter, in a step P603, the previously-received transmission confirmation command is analyzed. In this step, it is checked whether or not the user received the facsimile data, with reference to the job management table for the user who has been indicated as the final destination. Then, the response data is produced or generated on the basis of the checked result (step P604). The produced response data includes the information as to whether or not the user indicated as the destination has been registered in the RAM 103, information as to whether or not the facsimile data from the transmission side has been received, information as to whether or not the received data has been drawn or derived by the user, and the like.

Subsequently, in a step P605, transmission/reception of the communication data is inverted, to read the response data produced in the step P604 from the RAM 103 and transmit the read data to the partner side (i.e., transmission side). Then, when the transmission of the response data terminated, the flow advances to a step P606 to terminate the communication and disconnect the line.

When the communication terminated, in a step P607, the reception result obtaining command is received from the facsimile server 118 via the interface control unit 115. In this case, it is assumed that the facsimile server 118 always periodically produces the reception result obtaining command to detect whether or not the received data is present. Then, if the reception result obtaining command is received, the facsimile apparatus 201 checks whether or not the received command is normal (step P608). If not normal, the flow advances to a step P616 to notify the interface control unit 115 of the message "NG" and terminate the process. On the other hand, if normal, the facsimile apparatus 201 notifies, via the interface control unit 115, the facsimile server 118 of the reception result information (step P609). The reception result information to be notified in the step P609 includes the reception job discrimination information, reception confirmation data discrimination information, reception confirmation response data discrimination information and the like.

Subsequently, in a step P610, the facsimile apparatus 201 receives a reception confirmation command (or indication) data transfer request command from the facsimile server 118. By the reception confirmation command data transfer request command, the reception confirmation data discrimination information or the like which has been notified at the time of obtaining the reception result is indicated. Then, in a step P611, the received command is analyzed. In this case, if the command is not normal, e.g., the abnormality is found in the data discrimination information, the flow branches off to the step P616. On the other hand, if the command is normal, the flow advances to a step P612 to transfer reception confirmation command (or indication) data to the facsimile server 118. Then, the facsimile apparatus 201 receives a reception confirmation response data transfer request command from the facsimile server 118 (step P613). By the reception confirmation response data transfer request command, the facsimile data discrimination information or the like is indicated. Thereafter, in a step P614, the received command is analyzed. In this case, if the command is not normal, e.g., the abnormality is found in the data discrimination information, the flow branches off to the step P616, while if the command is normal, the flow advances to a step P615 to transfer the response data transmitted to the partner side, to the facsimile server 118.

Figure 7:
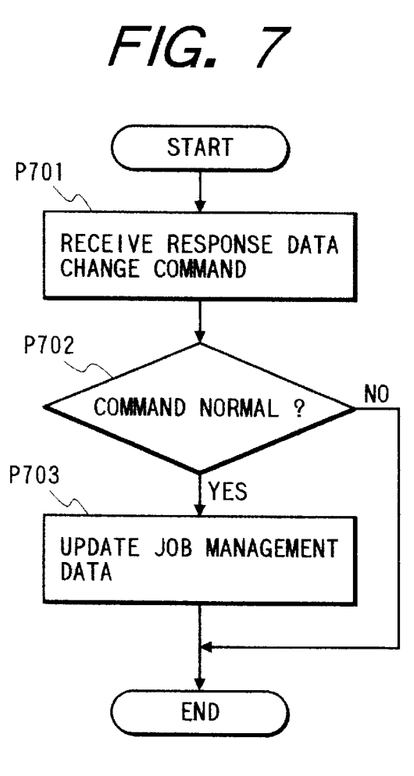
FIG. 7 is a flow chart showing a flow of process by the facsimile apparatus 201.

FIG. 7 is a flow chart showing a flow of process which is performed in a case where the facsimile apparatus 201 received a response data change command from the facsimile server 118 via the interface control unit 115. The facsimile server 118 produces or issues the response data change command (steps P309, P311, P315, P316) in accordance with a state of the destination client user.

Initially, in a step P701, the facsimile apparatus 201 receives the response data change command and analyzes it. In the response data change command, by a job identifier, it is notified of user state information or the like which represents a destination user identifier, a registration state of the destination user into the LAN 119, a connection state of the destination user to the LAN (i.e., whether or not the destination user has logged in), reception notification information to the destination user (i.e., whether or not the data reception has been notified/a notified time), reception data confirmation information by the destination user (i.e., whether or not the received data has been drawn or derived/a drawing time) and the like. In a step P702, it is examined whether or not the command received in the step P701 is normal. If not normal, e.g., indicated management information does not exist in the command, the facsimile apparatus 201 notifies the facsimile server 118 of the message "NG". On the other hand, if normal, in a step P703, the job management table formed in the step P505 (FIG. 5) is rewritten and updated every time the facsimile apparatus 201 receives the response data change command. The job management data is managed by the job identifier for each communication to the partner side and includes the destination user identifier, the registration state of the destination user in the LAN, the connection state of the destination user to the LAN (i.e., whether or not the destination user has logged in), the reception notification information to the destination user (i.e., whether or not the destination user has been notified of the received data/the notified time) and the reception data confirmation information by the destination user (i.e., whether or not the received data has been drawn or derived/the drawing time).

Figure 8:
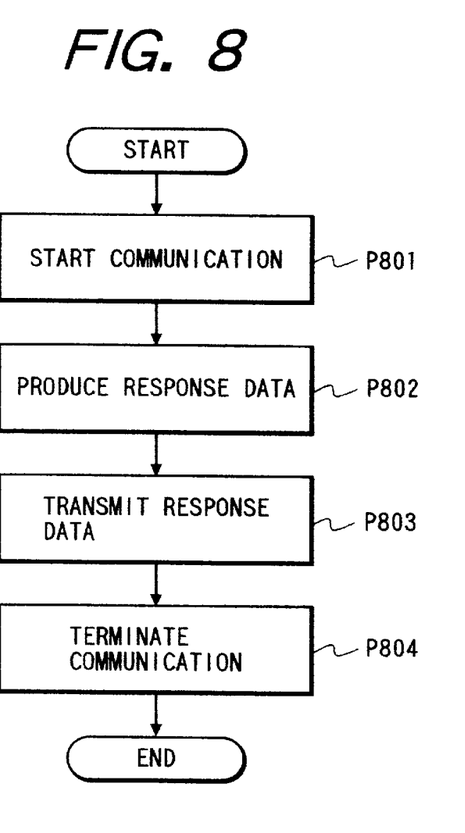
FIG. 8 is a flow chart showing a flow of process by the facsimile apparatus 201.
Figure 9A:
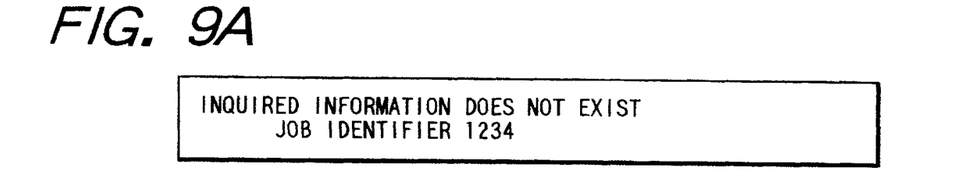
FIGS. 9A, 9B, 9C, 9D, 9E and 9F are views showing examples of response data.
Figure 9B:
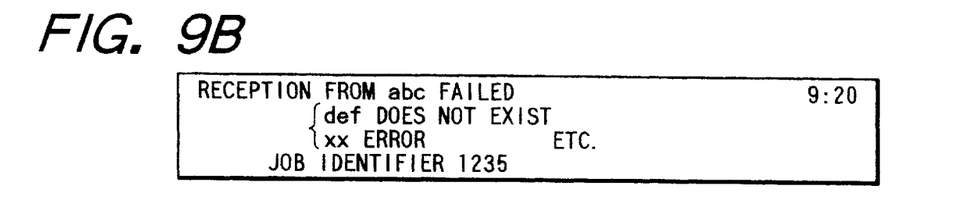
Figure 9C:
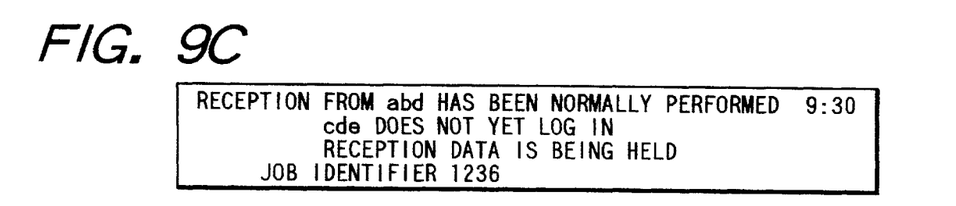
Figure 9D:
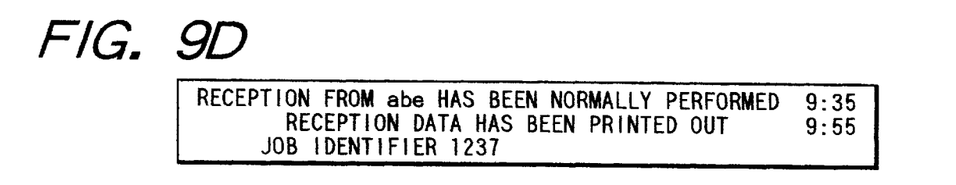
Figure 9E:
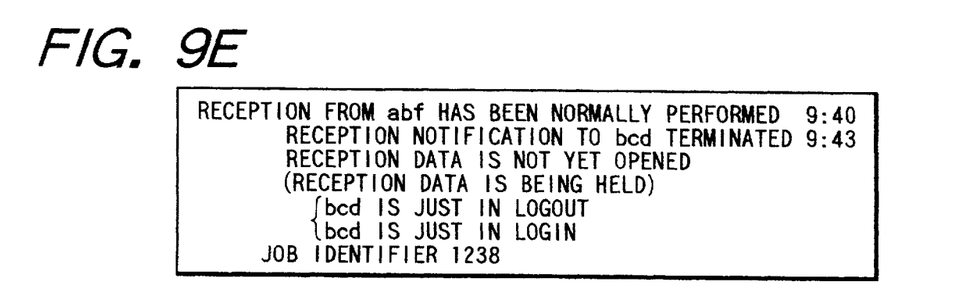
Figure 9F:
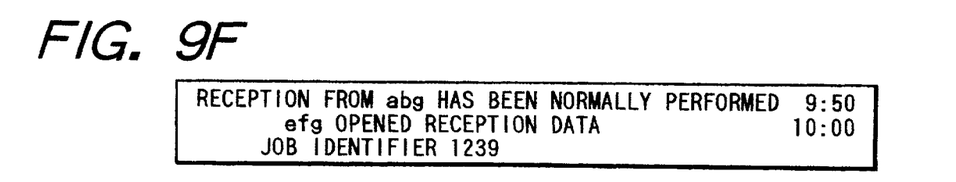

FIG. 8 is a flow chart for explaining a process in which data (response data) for notifying the transmission side of whether or not the destination user in the LAN 119 has confirmed the data destined for such the user and previously received by the facsimile apparatus 201.

In FIG. 8, a step P801 represents a process in which the call is generated to a partner's apparatus (i.e., partner side) on the basis of the transmission source facsimile number included in the facsimile data transmission command stored in the RAM 103, the communication line 116 is connected, a communication mode and the like are set, and the communication starts.

A step P802 represents a process in which, on the basis of job management data produced in the process shown in FIG. 7, the response data (i.e., receiver information data) in a predetermined data format to be sent to the partner's apparatus via the communication line 116 is produced and stored in the RAM 103.

A step P803 represents a process in which the response data produced in the step P802 is read from the RAM 103 and then sent to the partner's apparatus via the communication line 116. In this step, such sending starts when the reception confirmation command is received or a predetermined time elapses after the data from the partner side was received.

A step P804 represents a process in which the line is disconnected to terminate the communication.

In this case, the data to be sent to the communication line 116 is produced in the step P802 after the communication started. However, the data may be produced before the communication starts.

FIGS. 9A to 9F show an example of the response data. In this example, the job identifier, the transmission source name and the receiver name are added, on the basis of the information sent from the facsimile server 118 and the information sent from the partner's apparatus, to messages which have been previously stored in the ROM 102, and further time information and the like are added, whereby the response data is obtained.

In any case, there may be structure which inquires of the facsimile server 118 only in a case where the information corresponding to inquiry from the partner's apparatus (i.e., the response data corresponding to the partner's apparatus and the job identifier) is not present in the RAM 103.

Figure 10:
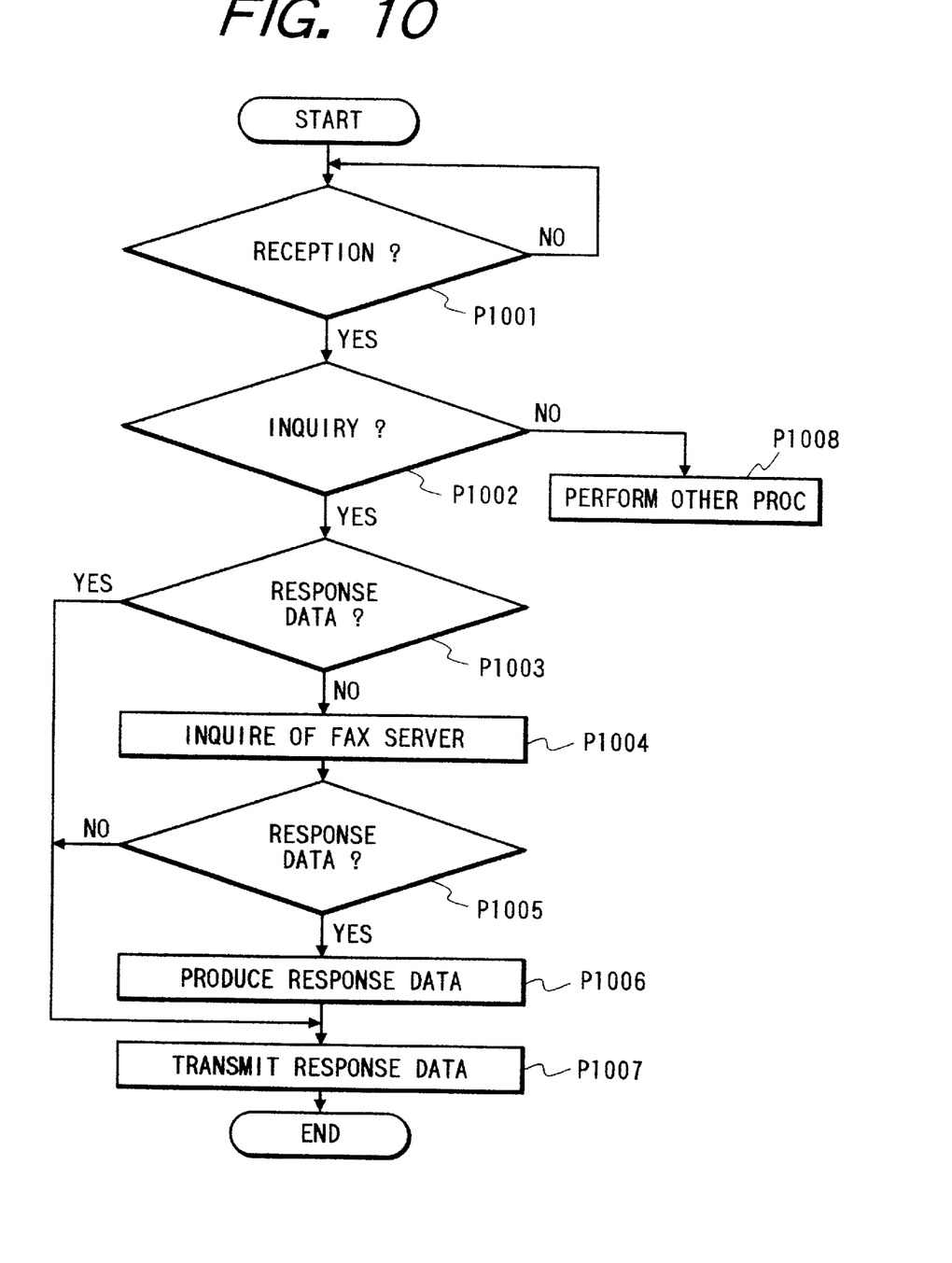
FIG. 10 is a flow chart showing a flow of process by the facsimile apparatus 201.

A flow of process in this case will be explained hereinafter with reference to a flow chart shown in FIG. 10.

Initially, in a step P1001, the call reception is waited for. Then, if there is the call reception, the flow advances to a step P1002 to judge whether or not such the call reception relates to inquiry about the reception result. If the call reception relates to the inquiry about the reception result, the flow advances to a step P1003, while if the call reception relates to the image data reception or the like, the flow advances to a step P1008 to perform other processes.

In the step P1003, it is judged whether or not the response data corresponding to a transmission source which inquired and the job identifier included in the inquiry is present in the RAM 103. If not present, the flow advances to a step P1004 to inquire of the facsimile server 118 about whether or not data corresponding to such to response data is present. Such inquiry may be performed by sending the command from the facsimile apparatus 201 to the facsimile server 118. Moreover, information representing that such the inquiry is desired may be added to a predetermined position in the RAM 103 such that the facsimile server 118 can see the information at the time of accessing.

Then, in a step P1005, if the data corresponding to the response data is present in the facsimile server 118, the facsimile apparatus 201 receives such the data to produce on the RAM 103 the response data as in FIGS. 9A to 9F (step P1006). Subsequently, in a step P1007, the response data is transmitted via the communication line 116.

Accordingly, even if the response data in the RAM 103 is broken or vanished for some reasons, the transmission can be performed.

As described above, according to the present embodiment, when the facsimile server 118 detects a change in a job progress stage, the server sends the information representing such a state to the facsimile apparatus 201. Therefore, the facsimile server 118 can easily and quickly respond to the transmission confirmation from the transmission side.

Further, the facsimile apparatus 201 stores (i.e., sequentially updates) the response data to be sent to the transmission side, at the predetermined area in the RAM 103. Therefore, the facsimile apparatus 201 can easily and quickly respond to the transmission confirmation sent from the transmission side only by reading and sending the stored contents at the predetermined area in the RAM 103.

Furthermore, when the predetermined time elapsed after the data was received from the transmission side or when the user on the LAN 119 drew the received data, the facsimile apparatus 201 sends the information as to the state of the received data, to the transmission side. Therefore, such the information can be quickly and effectively notified to the transmission side.

Furthermore, the flow chart shown in FIG. 3 represents the flow of the process which is performed by the CPU 101 on the basis of the program installed in the hard disk of the facsimile server 118, and the flow charts shown in FIGS. 4 to 8 and 10 represent the flows of the processes which are performed by the CPU 101 on the basis of the programs stored in the ROM 102. However, by storing these programs in a detachable memory medium such as an optomagnetic disk or the like, these programs can be applied to other apparatuses which can read these programs from the detachable memory medium.

As explained above, according to the present embodiment, the state of the data received from the transmission side can be easily notified to such the transmission side.

The present invention may be applied to a system constructed by a plurality of equipments (e.g., host computer, interface equipment, reader, printer and the like) or may be also applied to an apparatus comprising one equipment (e.g., copy machine, facsimile machine).

The invention employed by a method wherein program codes of a software to realize the functions of the foregoing embodiment are supplied to a computer in an apparatus or a system connected to various devices so as to make the devices operative in order to realize the functions of the foregoing embodiment and the various devices are operated in accordance with the programs stored in the computer (CPU or MPU) of the system or apparatus is also included in the scope of the present invention.

In such a case, the program codes themselves of the software realize the functions of the foregoing embodiment and the program codes themselves and means for supplying the program codes to the computer, for example, a memory medium in which the program codes have been stored construct the present invention.

As such a memory medium to store the program codes, for example, it is possible to use a floppy disk, a hard disk, an optical disk, an optomagnetic disk, a CD-ROM, a magnetic tape, a nonvolatile memory card, a ROM or the like.

It will be obviously understood that the program codes are included in the embodiments of the present invention even in not only a case where the functions of the foregoing embodiment are realized by executing the supplied program codes by the computer but also a case where the functions of the foregoing embodiment are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiment, the present invention is not limited to the foregoing embodiment but many modifications and variations are possible with the spirit and scope of the appended claims.

What is claimed is:

1. A computer readable program, stored in a storage medium, for controlling a server terminal in a communication system, said communication system comprising a data communication apparatus for transmitting and receiving data via a first line connected to an outside network, said server terminal managing a status of a user on a network, and said server terminal being connected to said data communication apparatus via a second line between said server terminal and data communication apparatus, said program comprising:

a notifying step of notifying, in a case where the data communication apparatus received data from a transmission side via the first line, the user on the network of a fact that the data reception was performed; and a sending step of sending, in a case where the notification in said notifying step was performed, information corresponding to the notification, to the data communication apparatus via the second line, wherein the data communication apparatus transmits the information sent in said sending step to said transmission side via the first line.

2. A computer readable program according to claim 1, wherein, in said notifying step, in a case where the user was designated, the designated user is notified of the fact that the data reception was performed.

3. A computer readable program according to claim 1, wherein, in a case where the notification is impossible in said notifying step, information representing such a fact is sent to the data communication apparatus.

4. A computer readable program, stored in a storage medium, for controlling a server terminal in a communication system, said communication system comprising a data communication apparatus for transmitting and receiving data via a first line connected to an outside network, said server terminal for managing a status of a user on a network, and said server terminal being connected to said data communication apparatus via a second line between said server terminal and data communication apparatus, said program comprising:

a discriminating step of discriminating that the user on the network drew the data received by the data communication apparatus from a transmission side via the first line; and a sending step of sending, in a case where the discrimination in said discriminating step was performed, information representing a fact that the received data was drawn, to the data communication apparatus via the second line wherein the data communication apparatus transmits the information sent in said sending step, to said transmission side via the first line.

5. A computer readable program according to claim 4, further comprising a notifying step of notifying, in a case where the data communication apparatus received the data from the transmission side via the first line, the user on the network of a fact that the data reception was performed, and wherein in said discriminating step, it is discriminated that the user who was notified in said notifying step drew the received data.

6. A data communication apparatus comprising:

connection means for connecting said data communication apparatus to a network;

reception means for receiving data from a transmission side via a line;

transfer means for transferring the data received by said reception means to a user on a network, via said connection means;

storage means for storing information which represents a progress stage of a processing of the data received by said reception means and including information as to whether or not the transfer by said transfer means was performed;

transmission means for transmitting the information stored in said storage means, in accordance with a request from the transmission side;

discriminating means for discriminating whether or not the information according to the request from the transmission side has been stored in said storage means; and obtaining means for obtaining said information through said connection means in a case where said discriminating means discriminated that the information according to the request from the transmission side had not been stored in said storage means, and wherein said transmission means transmits the information obtained by said obtaining means in a case where said discriminating means discriminated that the information according to the request from the transmission side had not been stored in said storage means.

7. An apparatus according to claim 6, wherein said transfer means transfers the data received by said reception means, to the user on the network who has been indicated by the transmission side.

8. An apparatus according to claim 6, wherein said storage means further stores information for specifying the data received by said reception means.

9. An apparatus according to claim 6, wherein said storage means further stores information representing a state of the user on the network connected to said connection means.

10. A data communication apparatus comprising:

connection means for connecting said data communication apparatus to a network;

reception means for receiving data from a transmission side via a line;

storage means for storing information related to the data received by said reception means;

transmission means for transmitting the information stored in said storage means, in accordance with a request from the transmission side;

discrimination means for discriminating whether or not the information according to the request from the transmission side has been stored in said storage means; and confirmation means for confirming the information related to the data received by said reception means, utilizing another apparatus via said connection means, wherein, in a case where said discrimination means discriminated that the information according to the request from the transmission side has been stored, said transmission means reads and transmits such the information, and in a case where said discrimination means discriminated that the information according to the request from the transmission side has not been stored in said storage means, said transmission means confirms said information by said confirmation means and sends said information.

11. An apparatus according to claim 10, wherein the information stored in said storage means is rewritten in accordance with a state of the data received by said reception means.

12. An apparatus according to claim 10, wherein the information stored in said storage means includes information as to a time.

13. A method for controlling a server terminal in a communication system, said communication system comprising a data communication apparatus for transmitting and receiving data via a first line connected to an outside network, said server terminal managing a status of a user on a network and being connected to said data communication apparatus via a second line between said server terminal and data communication apparatus, said method comprising:

a notifying step of notifying, in a case where the data communication apparatus received data from a transmission side via the first line, the user on the network of a fact that the data reception was performed; and a sending step of sending, in a case where the notification in said notifying step was performed, information corresponding the notification, to the data communication apparatus via the second line, wherein the data communication apparatus transmits the information sent in said sending step, to said transmission side via the first line.

14. A method for controlling a server terminal in a communication system, said communication system comprising a data communication apparatus for transmitting and receiving data via a first line connected to an outside network, said server terminal managing a status of a user on a network and being connected to said data communication apparatus via a second line between said server terminal and data communication apparatus, said method comprising:

a discriminating step of discriminating that the user on the network drew the data received by the data communication apparatus from a transmission side via the first line; and a sending step of sending, in a case where the discrimination in said discriminating step was performed, information representing a fact that the received data was drawn, to the data communication apparatus via the second line, wherein the data communication apparatus transmits the information sent in said sending step, to said transmission side via the first line.

15. A method for operating a data communication apparatus connected to a network, said method comprising the steps of:

receiving data from a transmission side via a line;

transferring said received data to a user on a network;

storing information which represents a progress stage of a processing of the data and including information as to whether or not said data was transferred;

transmitting said information in accordance with a request from the transmission side;

discriminating whether or not the information according to the request from the transmission side has been stored;

sending an inquiry concerning said information in a case where said discriminating step discriminated that the information according to the request from the transmission side had not been stored and obtaining said information; and transmitting the information obtained through said inquiring step in a case where said discriminating step discriminated that the information according to the request from the transmission side had not been stored.

16. A method for operating a data communication apparatus connected to a network, said method comprising:

receiving data from a transmission side via a line;

storing information related to said received data;

transmitting said information in accordance with a request from the transmission side;

discriminating whether or not the information according to the request from the transmission side has been stored;

confirming the information related to the data received in said receiving step utilizing another apparatus;

wherein, in a case where said discriminating step discriminated that the information according to the request from the transmission side had been stored, reading and transmitting such information, and in a case where said discrimination step discriminated that the information according to the request from the transmission side had not been stored, confirming said information and then transmitting said information.

17. A communication system comprising:

a data communication apparatus for transmitting and receiving data via a first line connected to an outside network; and a server terminal for managing a status of a user on a network, said server terminal being connected to said data communication apparatus via a second line between said server terminal and data communication apparatus;

wherein, in a case where the data communication apparatus received the data from a transmission side via the first line, said server terminal notifies the user on the network of a fact that the data reception was performed and sends information corresponding to the notification to the data communication apparatus via the second line, wherein said data communication apparatus transmits the information, which said server terminal sent via the second line, to said transmission side via the first line.

18. A communication system comprising:

a data communication apparatus for transmitting and receiving data via a first line connected to an outside network;

a server terminal for managing a status of a user on a network, said server terminal being connected to said data communication apparatus via a second line between said server terminal and data communication apparatus; and means for discriminating that the user on the network drew the data received by the data communication apparatus from a transmission side via the first line;

wherein, in a case where the discrimination in said discriminating step was performed, said server terminal sends information representing a fact that the received data was drawn to the data communication apparatus via the second line wherein said data communication apparatus transmits the information, which said server terminal sent via the second line, to said transmission side via the first line.

19. A computer readable program, stored in a storage medium, for operating a data communication apparatus connected to a network, said program comprising:

a receiving step of receiving data from a transmission side via a line;

a transferring step of transferring said received data to a user on a network;

a storing step of storing information which represents a progress stage of a processing of the data and including information as to whether or not said data was transferred;

a first transmitting step of transmitting said information in accordance with a request from the transmission side;

a discriminating step of discriminating whether or not the information according to the request from the transmission side has been stored;

a sending step of sending an inquiry concerning said information in a case where said discriminating step discriminated that the information according to the request from the transmission side had not been stored and obtaining said information; and a second transmitting step of transmitting the information obtained through said inquiring step in a case where said discriminating step discriminated that the information according to the request from the transmission side had not been stored.

20. A computer readable program, stored in a storage medium, for operating a data communication apparatus connected to a network, said program comprising:

a receiving step of receiving data from a transmission side via a line;

a storing step of storing information related to said received data;

a first transmitting step of transmitting said information in accordance with a request from the transmission side;

a discriminating step of discriminating whether or not the information according to the request from the transmission side has been stored;

a first confirming step of confirming the information related to the data received in said receiving step utilizing another apparatus;

a second transmitting step of reading and transmitting such information, in a case where said discriminating step discriminated that the information according to the request from the transmission side had been stored; and a second confirming step of confirming said information and then transmitting said information, in a case where said discrimination step discriminated that the information according to the request from the transmission side had not been stored.

* * * * *